United States Patent
Suslick et al.

(10) Patent No.: US 9,914,106 B2
(45) Date of Patent: Mar. 13, 2018

(54) METHOD OF PRODUCING SILICONE MICROSPHERES

(71) Applicant: The Board of Trustees of the University of Illinois, Urbana, IL (US)

(72) Inventors: Kenneth S. Suslick, Champaign, IL (US); Nitin K. Neelakantan, Champaign, IL (US); Jacqueline M. Rankin, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 253 days.

(21) Appl. No.: 15/004,016

(22) Filed: Jan. 22, 2016

(65) Prior Publication Data

US 2016/0214075 A1 Jul. 28, 2016

Related U.S. Application Data

(60) Provisional application No. 62/106,870, filed on Jan. 23, 2015.

(51) Int. Cl.
| | |
|---|---|
| *C08L 83/04* | (2006.01) |
| *C08G 77/04* | (2006.01) |
| *B01J 2/04* | (2006.01) |
| *B01J 2/18* | (2006.01) |
| *B01J 13/18* | (2006.01) |
| *B01J 13/14* | (2006.01) |
| *C09B 67/02* | (2006.01) |

(52) U.S. Cl.
CPC .......... *B01J 13/14* (2013.01); *C09B 67/0097* (2013.01)

(58) Field of Classification Search
None
See application file for complete search history.

(56) References Cited

U.S. PATENT DOCUMENTS

| 4,743,507 A * | 5/1988 | Franses ..................... B29B 9/12 |
| | | 264/146 |
| 5,486,551 A * | 1/1996 | Polmanteer .............. C08J 3/124 |
| | | 523/212 |

(Continued)

FOREIGN PATENT DOCUMENTS

CN       103474253       12/2013

OTHER PUBLICATIONS

Abbasi, Farhang et al., "Bulk and surface modification of silicone rubber for biomedical applications", *Polymer International*, 51 (2002), pp. 882-888; DOI: 10.1002/pi.1069.

(Continued)

*Primary Examiner* — Mary Lynn F Theisen
(74) *Attorney, Agent, or Firm* — Brinks Gilson & Lione

(57) ABSTRACT

A method of making silicone microspheres comprises nebulizing a silicone precursor solution comprising one or more oligomeric dimethylsiloxanes, a catalyst and a solvent into an aerosol comprising a plurality of droplets. Each droplet comprises the silicone precursor solution. The droplets are entrained in a gas which is flowed through a reaction zone comprising light energy and/or heat energy. Upon exposure of the droplets to the light energy and/or the heat energy, the solvent evaporates and the one or more oligomeric dimethylsiloxanes are polymerized. Thus, silicone microspheres are formed from the droplets of the aerosol.

**20 Claims, 13 Draw

(56) References Cited

U.S. PATENT DOCUMENTS

| | | | |
|---|---|---|---|
| 8,911,904 B2 | 12/2014 | Parans et al. | |
| 2003/0113354 A1* | 6/2003 | Schmid | A61K 8/02 424/401 |

OTHER PUBLICATIONS

Andriot, M. et al., "Silicones in Industrial Applications", *Inorganic Polymers* (Ed: R. De Jaeger and M. Gleria), Nova Science Publishers, New York (2007), pp. 1-106.
Baltussen, Erik et al., "A Novel Type of Liquid/Liquid Extraction for the Preconcentration of Organic Micropollutants from Aqueous Samples: Application to the Analysis of PAH's and OCP's in Water", *J. High Resol. Chromatogr.*, 20 (1997), pp. 395-399.
Bang, Jin Ho et al., "Nanostructured ZnS:Ni$_{2+}$ Photocatalysts Prepared by Ultrasonic Spray Pyrolysis", *Advanced Materials*, 20 (2008), pp. 2599-2603; DOI: 10.1002/adma.200703188.
Bang, Jin Ho et al., "Nanostructured Materials Through Ultrasonic Spray Pyrolysis", *Material Matters*, 7, 2 (2012), pp. 15-20.
Bang, Jin Ho et al., "Applications of Ultrasound to the Synthesis of Nanostructured Materials", *Advanced Materials*, 22 (2010), pp. 1039-1059.
Buzio, Renato et al., "Deformation and Adhesion of Elastomer Poly(dimethylsiloxane) Colloidal AFM Probes", *Langmuir*, 23 (2007), pp. 9293-9302.
Camino, G. et al., "Polydimethylsiloxane thermal degradation Part 1. Kinetic aspects", *Polymer*, 42 (2001), pp. 2395-2402.
Ciriminna, Rosaria et al., "Sol-gel microencapsulation of odorants and flavors: opening the route to sustainable fragrances and aromas", *Chem. Soc. Rev.*, 42 (2013) pp. 9243-9250.
Crisp, Angela et al., "Effect of Silicone Oil, Viscosity on Emulsification", *Arch. Ophthalmol.*, 105 (1987), pp. 546-550.
Didenko, Yuri T. et al., "Chemical Aerosol Flow Synthesis of Semiconductor Nanoparticles", *J. Am. Chem. Soc.*, 127, 35 (2005), pp. 12196-12197.
Dufaud, O. et al., "Porous Elastomeric Beads from Crosslinked Emulsions", *J. Appl. Polym. Sci.*, 83 (2002) pp. 967-971.
Fortunato, Maria E. et al., "Nanostructured Carbons Prepared by Ultrasonic Spray Pyrolysis", *Chem. Mater.*, 22, 5 (2010) pp. 1610-1612; DOI:10.1021/cm100075j.
Gholap, S. B., "Hollow Microsphere: a Review", *International Journal of Pharmaceutical Sciences Review and Research*, 1, 1 (2010), pp. 74-79; Article 015.
González, Lidia et al., "Encapsulated PDMS Microspheres with Reactive Handles", *Macromolecular Materials and Engineering*, 299 (2014), pp. 729-738; DOI: 10.1002/mame.201300319.
Graiver, D. et al., "A Review of the Fate and Effects of Silicones in the Environment", *Journal of Polymers and the Environment*, 11, 4 (2003) pp. 129-136.
Guo, Jinrui et al., "Gold nanoparticles encapsulated in porous carbon", *Chem. Commun.*, 48 (2012) pp. 11094-11096.
Gupta, Devinder et al., "Standard Reference Materials: Polystyrene Films for Calibrating the Wavelength Scale of Infrared Spectrophotometers—SRM 1921", *NIST Spec. Publ.* 260-122 (1995); 44 pages.
Ioppolo, T. et al., "High-resolution force sensor based on morphology dependent optical resonances of polymeric spheres", *Journal of Applied Physics*, 105, 013535 (2009) pp. 1-9; doi: 10.1063/1.3054338.
John, Renu et al., "Targeted Multifunctional Multimodal Protein-Shell Microspheres as Cancer Imaging Contrast Agents", *Molecular Imaging and Biology*, 14 (2012) pp. 17-24; DOI: 10.1007/s11307-011-0473-7.
Jungmann, Nadja et al., "Synthesis of Amphiphilic Poly(organosiloxane) Nanospheres with Different Core-Shell Architectures", *Macromolecules*, 35,18 (2002) pp. 6851-6857.

Kim, Mi Sun et al., "Synthesis of monodisperse PS-co-PDMS microspheres by dispersion polymerization", *Materials Science and Engineering C*, 27 (2007) pp. 1247-1251.
Koh, Andrew et al., "Flocculation and Coalescence of Oil-in-Water Poly(dimethylsiloxane) Emulsions", *Journal of Colloid and Interface Science*, 227 (2000) pp. 390-397; doi:10.1006/jcis.2000.6909.
Kost, Joseph et al., "Responsive polymeric delivery systems", *Advanced Drug Delivery Reviews*, 64 (2012) pp. 327-341.
Lee, Jessamine Ng et al., "Solvent Compatibility of Poly(dimethylsiloxane)-Based Microfluidic Devices", *Analytical Chemistry*, 75, 23 (2003) pp. 6544-6554.
Meszlényi, G. et al., "Infrared Spectroscopic Investigation of Propylene Oxide-Ethylene Oxide Polymer", *Acta Physica Hungarica*, 63 (1-2) (1988) pp. 137-140.
Motl, Nathan E. et al., "Aerosol-assisted synthesis and assembly of nanoscale building blocks", *J. Mater. Chem. A*, 1 (2013) pp. 5193-5202.
Mukhopadhyay, Rajendrani, "When PDMS isn't the best", *Analytical Chemistry*, 79 (2007) pp. 3248-3253.
Okuyama, Kikuo et al., "Preparation of nanoparticles via spray route", *Chemical Engineering Science*, 58 (2003) pp. 537-547.
Overcash, John W. et al., "High Surface Area Iron Oxide Microspheres via Ultrasonic Spray Pyrolysis of Ferritin Core Analogues", *Chemistry of Materials*, 27 (2015) pp. 3564-3567; DOI: 10.1021/acs.chemmater.5b00766.
Reddy, Christopher M. et al., "Composition and fate of gas and oil released to the water column during the *Deepwater* Horizon oil spill", *PNAS*, 109, 50 (2012) pp. 20229-20234.
Roy, Prasun Kumar et al., "Polysiloxane-based core-shell microspheres for toughening of epoxy resins", *J. Polym. Res.*, 21:348 (2014) pp. 1-9.
Sayyah, Maryam et al., "CaO-based sorbents for $CO_2$ capture prepared by ultrasonic spray pyrolysis", *RSC Advances*, 3 (2013) pp. 19872-19875; DOI: 10.1039/c3ra44566f.
Seethapathy, Suresh et al., "Applications of polydimethylsiloxane in analytical chemistry: A review", *Analytica Chimica Acta*, 750 (2012) pp. 48-62.
Sengul, Hatice et al., "Analysis of hazardous material releases due to natural hazards in the United States", *Disasters*, 36 (2012) pp. 723-743; doi:10.1111/j.1467-7717.2012.01272.x.
Skrabalak, S. E. et al., "Aerosol Spray Synthesis of Porous Molybdenum Sulfide Powder", *Materials Syntheses*, (Eds: U. Schubert, N. Hüsing, R. Laine), Springer, Vienna 2008, pp. 83-88.
Skrabalak, S. E. et al., "Porous Carbon Powders Prepared by Ultrasonic Spray Pyrolysis", *J. Am. Chem. Soc.*, 128 (2006) pp. 12642-12643.
Skrabalak, S. E. et al., "Porous $MoS_2$ Synthesized by Ultrasonic Spray Pyrolysis", *J. Am. Chem. Soc.*, 127 (2005) pp. 9990-9991.
Suh, Won Hyuk et al., "Porous, Hollow, and Ball-in-Ball Metal Oxide Microspheres: Preparation, Endocytosis, and Cytotoxicity", *Advanced Materials*, 18 (2006) pp. 1832-1837; DOI: 10.1002/adma.200600222.
Tang, Qi et al., "Poly (dimethyl siloxane)/poly (2-hydroxyethyl methacrylate) interpenetrating polymer network beads as potential capsules for biomedical use", *Current Applied Physics*, 11 (2011) pp. 945-950.
Tepper, Gary et al., "Polymer Deposition from Supercritical Solutions for Sensing Applications", *Ind. Eng. Chem. Res.*, 39, 12 (2000) pp. 4445-4449.
Todorov, Filip et al., "Preparation and characterization of optical microspheres for refractive-index sensing", *Proc. SPIE*, 7716: *Micro-Optics*, 2010, Brussels, May 2010, pp. 77161X-1-77161X-9.
Toepke, Michael W. et al., "PDMS absorption of small molecules and consequences in microfluidic applications", *Lab Chip*, 6 (2006) pp. 1484-1486; DOI: 10.1039/b612140c.
Torchilin, Vladimir P., "Multifunctional nanocarriers", *Advanced Drug Delivery Reviews*, 64 (2012) pp. 302-315.
Trenkel, M. E., "Slow- and Controlled-Release and Stabilized Fertilizers: An Option for Enhancing Nutrient Use Efficiency in Agriculture", *International Fertilizer Industry Association (IFA)*, Paris, France (2010), pp. 1-160.

(56) References Cited

OTHER PUBLICATIONS

Wu, Jing et al., "Electrospun Porous Structure Fibrous Film with High Oil Adsorption Capacity", *ACS Appl. Mater. Interfaces*, 4 (2012) pp. 3207-3212.

Xia, Bin et al., "Novel Route to Nanoparticle Synthesis by Salt-Assisted Aerosol Decomposition", *Advanced Materials*, 13, 20 (2001) pp. 1579-1582.

Xu, Hangxun et al., "Porous Carbon Spheres from Energetic Carbon Precursors using Ultrasonic Spray Pyrolysis", *Advanced Materials*, 24 (2012) pp. 6028-6033.

Yilgör, Emel et al., "Silicone containing copolymers: Synthesis, properties and applications", *Progress in Polymer Science*, 39 (2014) pp. 1165-1195.

Zhu, Haitao et al., "Evaluation of Electrospun Polyvinyl Chloride/Polystyrene Fibers as Sorbent Materials for Oil Spill Cleanup", *Environmental Science & Technology*, 45 (2011) pp. 4527-4531; dx.doi.org/10.1021/es2002343.

Akgün, E. et al., "Cationic Aerosol Photopolymerization," *Macromol. Mater. Eng.*, 300 (2015) pp. 136-139.

Akgün, E. et al., "Perspectives of Aerosol-Photopolymerization: Nanostructured Polymeric Particles," *Macromol. Mater. Eng.*, 299 (2014) pp. 1316-1328.

Akgün, E. et al., "Perspectives of Aerosol-Photopolymerization: Nanoscale Polymer Particles," *Chemical Engineering Science*, 101 (2013) pp. 248-252.

Esen, C. et al., "Preparation of Monodisperse Polymer Particles by Photopolymerization," *Journal of Colloid and Interface Science*, 179 (1996) pp. 276-280.

Peng, S. et al., "Magnetically Responsive Elastic Microspheres," *Applied Physics Letters*, 92 (2008) pp. 012108-1-012108-3.

Pingali, K.C. et al., "Silver Nanoparticles from Ultrasonic Spray Pyrolysis of Aqueous Silver Nitrate," *Aerosol Science and Technology*, 39:10 (2005) pp. 1010-1014.

Shin, D.S. et al., "Preparation of Polymer Particles in Aerosol-Phase Reaction," *Aerosol Science and Technology*, 24:4 (1996) pp. 243-254.

Suh. W.H. et al., "Magnetic and Porous Nanospheres from Ultrasonic Spray Pyrolysis," *J. Am. Chem. Soc.* 127 (2005) pp. 12007-12010.

Suslick, K.S. et al., "Acoustic Cavitation and its Chemical Consequences," *Phil. Trans. R. Soc. Lond. A*, 357 (1999) pp. 335-353.

Vorderbruggen, M.A. et al., "Use of Cationic Aerosol Photopolymerization to Form Silicone Microbeads in the Presence of Molecular Templates," *Chem. Mater.* 8 (1996) pp. 1106-1111.

\* cited by examiner

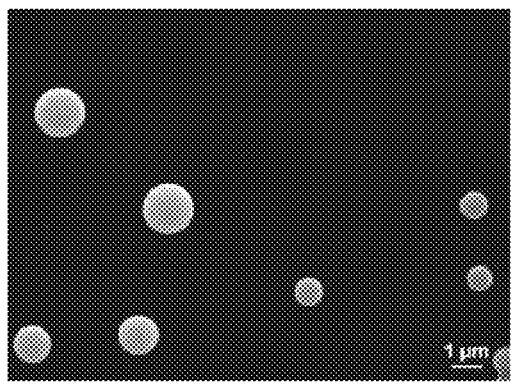 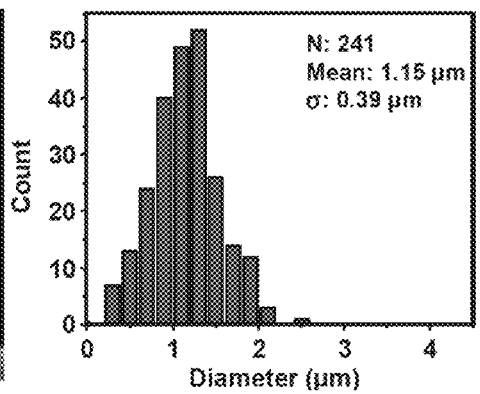
Figure 3C　　　　　　　　　　Figure 3D
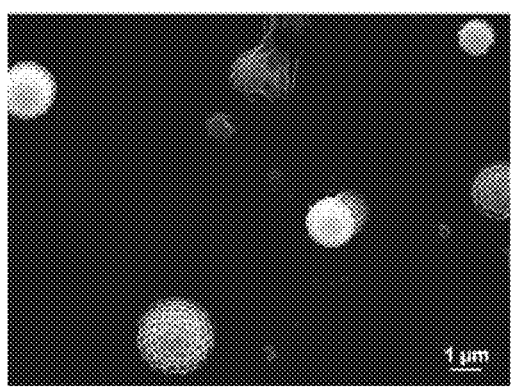 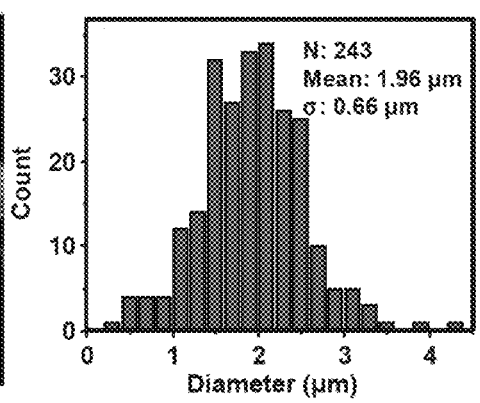
Figure 3E　　　　　　　　　　Figure 3F
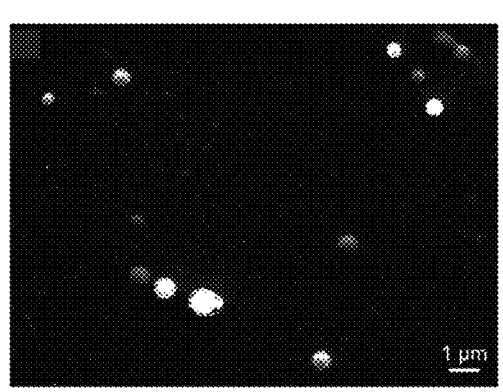 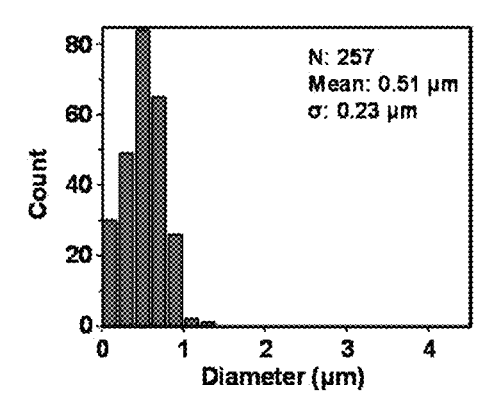
Figure 3G　　　　　　　　　　Figure 3H Figure 4A
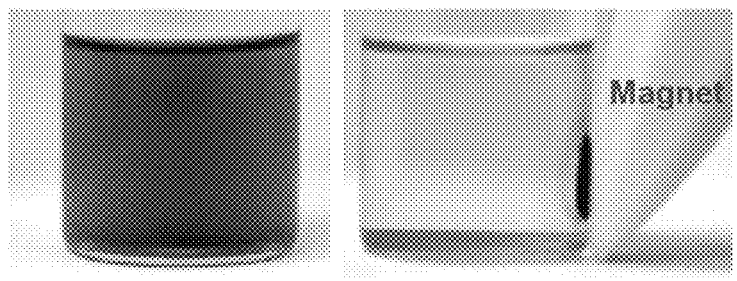
Figure 4B
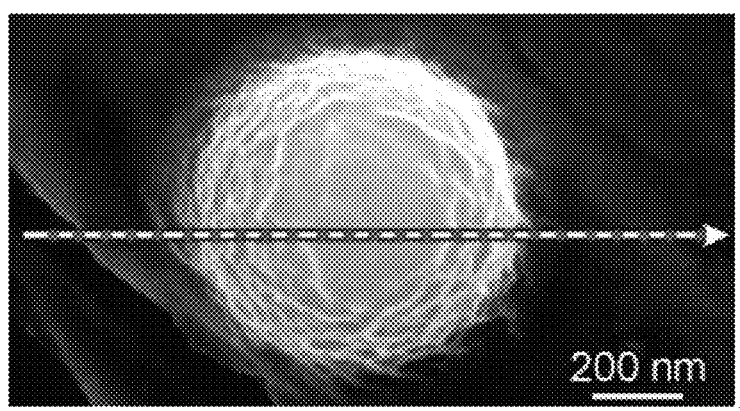
Figure 4C
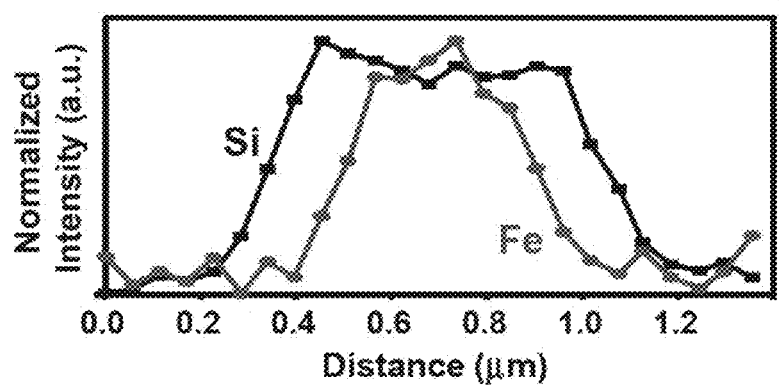
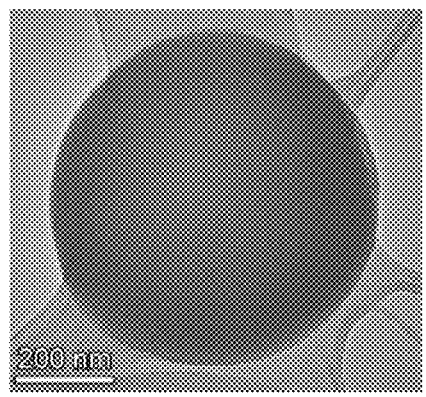
Figure 4D
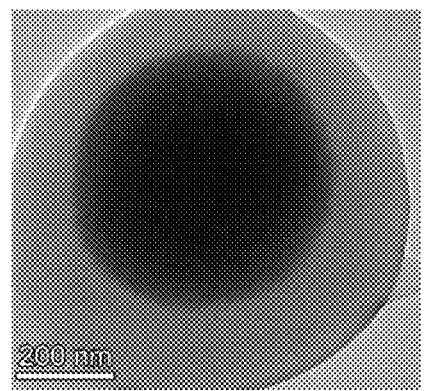
Figure 4E

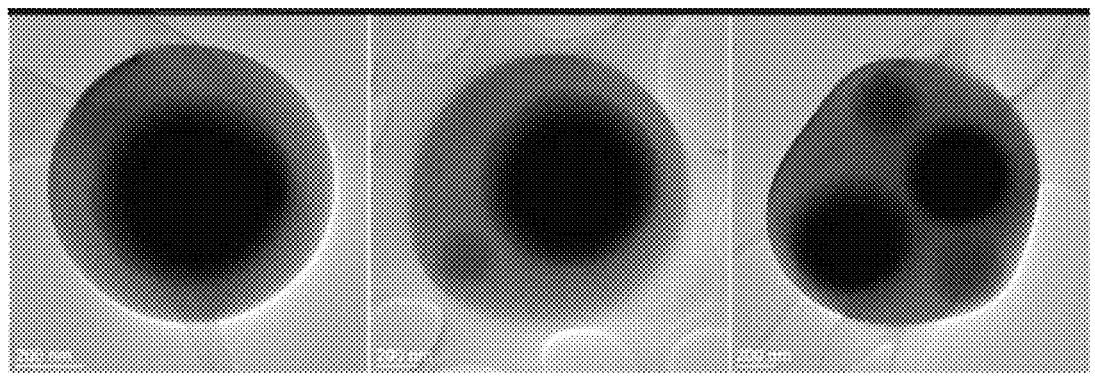
Figure 5A    Figure 5B    Figure 5C
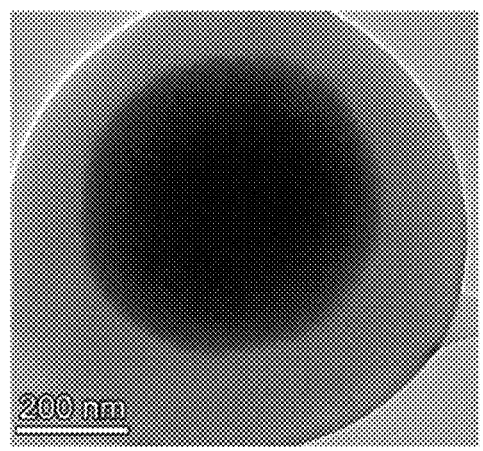    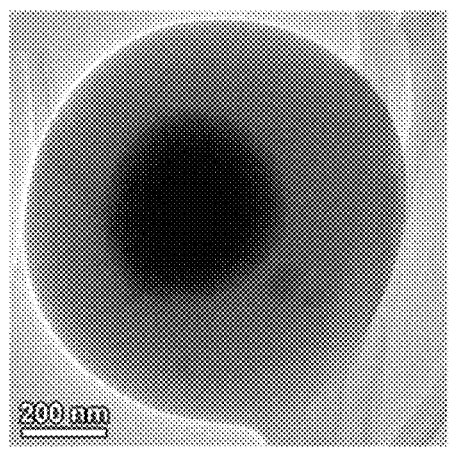
Figure 6A    Figure 6B
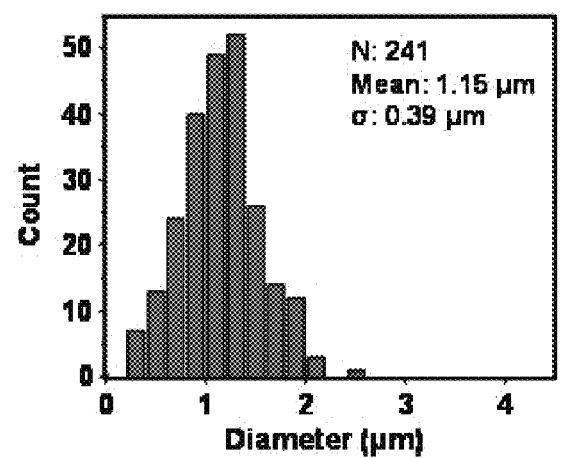
Figure 6C

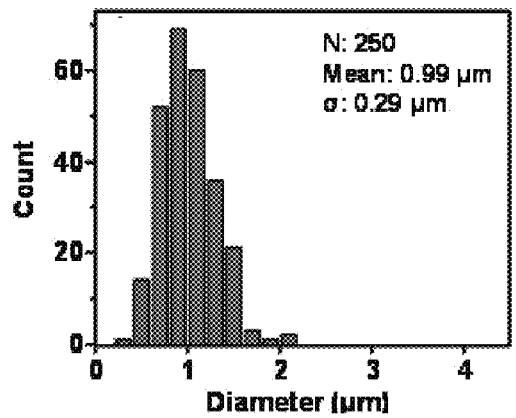
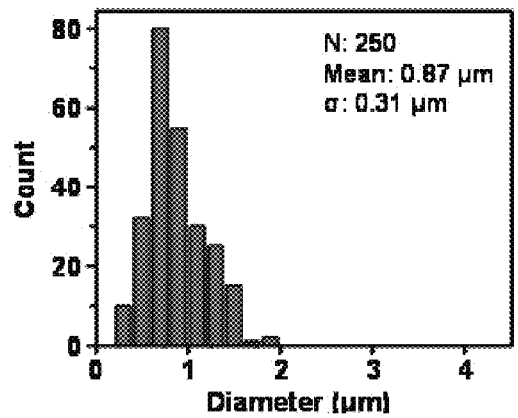
Figure 6D
Figure 6E
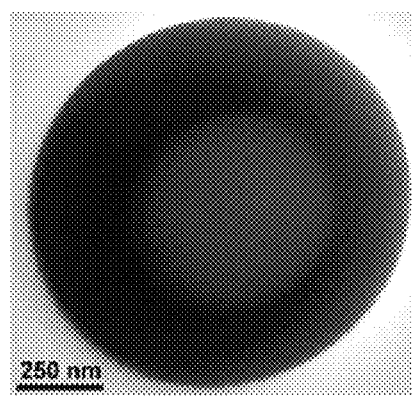
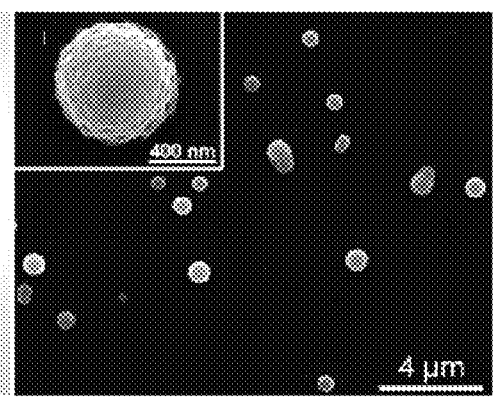
Figure 7A
Figure 7B
Figure 7C
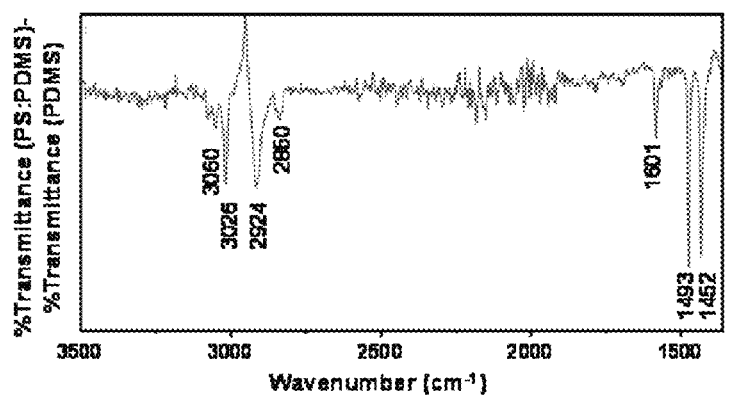

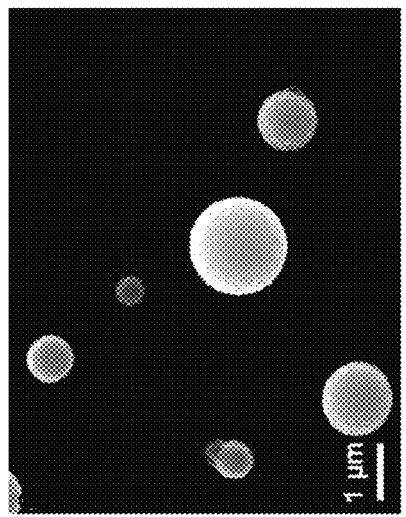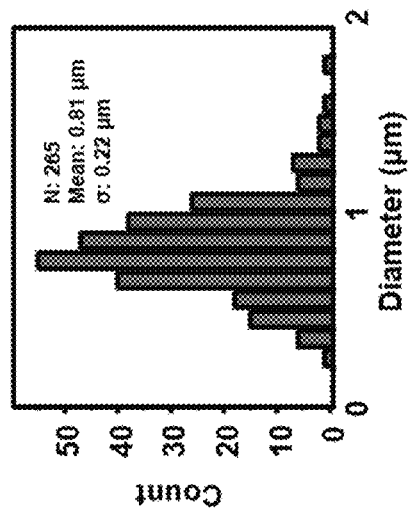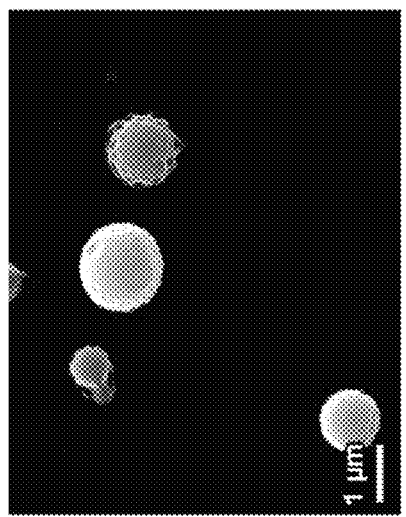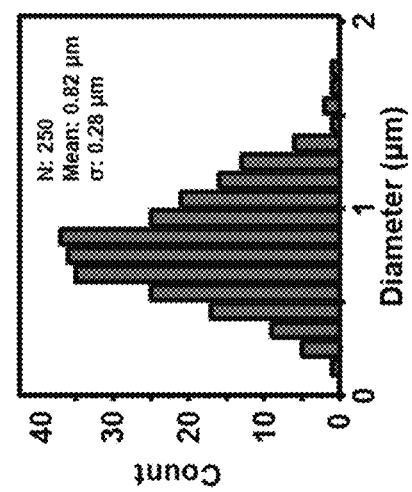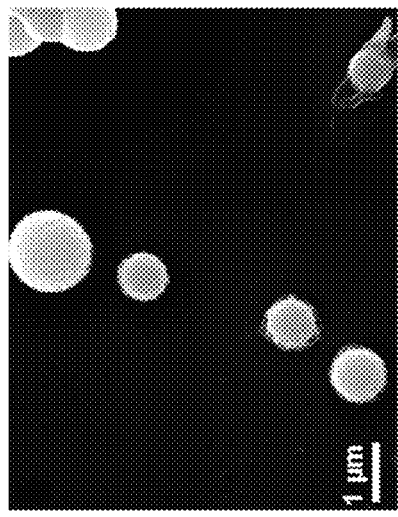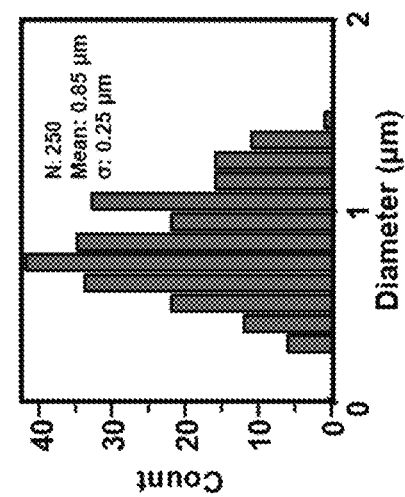
Figure 8A  Figure 8B  Figure 8C

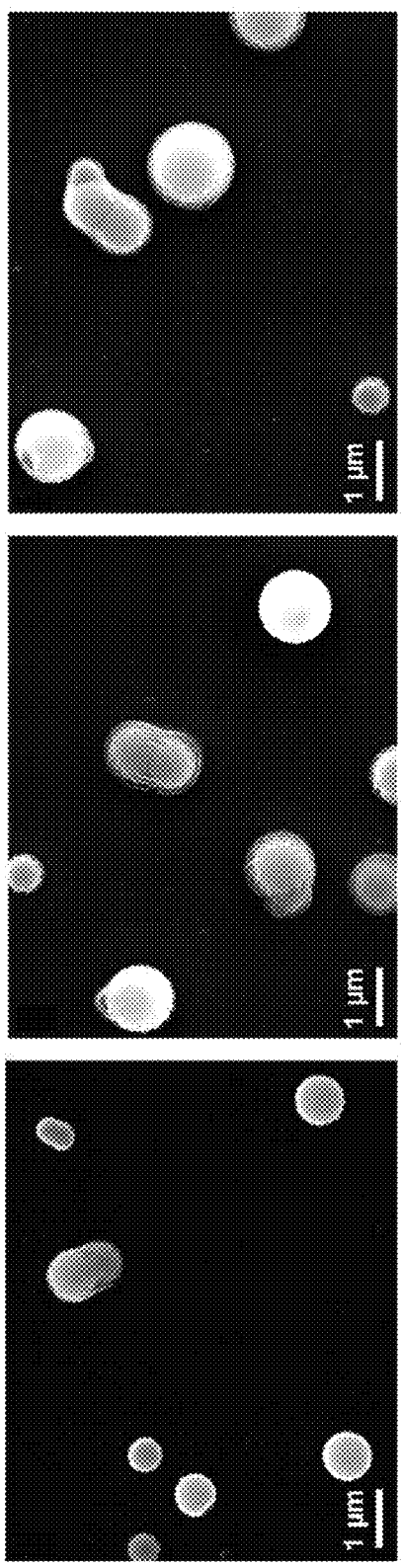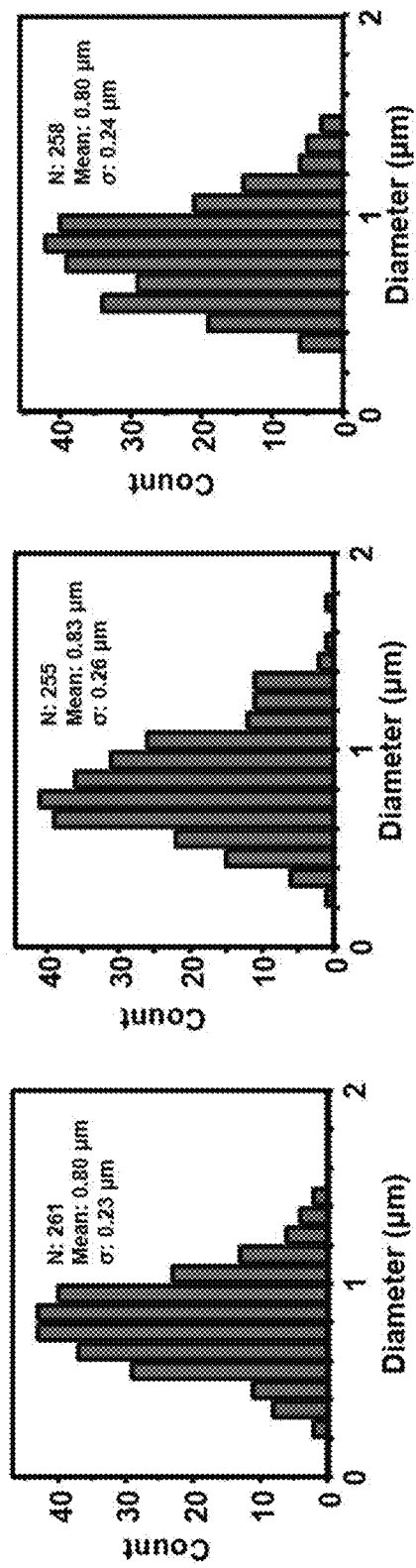
Figure 8D  Figure 8E  Figure 8F

US 9,914,106 B2

METHOD OF PRODUCING SILICONE MICROSPHERES

RELATED APPLICATIONS

The present patent document claims the benefit of priority under 35 U.S.C. 119(e) to U.S. Provisional Patent Application Ser. No. 62/106,870, filed on Jan. 23, 2015, which is hereby incorporated by reference in its entirety.

FEDERALLY SPONSORED RESEARCH OR DEVELOPMENT

This invention was made with government support under contract number DMR1206355 and DGE1144245 awarded by the National Science Foundation. The government has certain rights in the invention.

TECHNICAL FIELD

The present disclosure is directed generally to the synthesis of polymer particles and more particularly to the fabrication of silicone microspheres by spray pyrolysis.

BACKGROUND

Silicones, polymers with a backbone of silicon-oxygen bonds, are widely used as sorbents, adhesives, lubricants, coatings, and materials for microfluidics, medical devices, and precision molding. Polydimethylsiloxane (PDMS) and other silicones are gas permeable, biologically compatible, optically clear, hydrophobic and biodegradable. They also exhibit good dielectric properties and high thermal and chemical stability, and they swell in organic solvents, especially hydrocarbons. Despite the prevalence of bulk silicone polymers, a scalable synthetic method for producing stable, micron-sized, spherical particles (microspheres) of crosslinked silicones has proven extraordinarily challenging due to the low surface energy of silicone oligomers and their tendency to coalesce and agglomerate during emulsion polymerizations, especially at the elevated temperatures that may be required for polymer curing.

For example, emulsion polymerizations of silicone spheres produce large, polydisperse microspheres ranging in diameter from 50 microns to hundreds of microns with a multimodal size distribution. Other synthetic methods include rapid expansion of a supercritical solution to produce liquid PDMS microspheres, grinding of silicone tubing under liquid nitrogen to form PDMS microparticles, dipping a fiber into noncrosslinked PDMS for "one-at-a-time" PDMS microsphere synthesis, and use of a microfluidic channel to fabricate crosslinked PDMS magnetic microspheres. These methods are cumbersome, have low production rates, and produce only large microspheres (e.g., >100 μm to 1 mm in diameter).

Despite the fabrication challenges, many potential applications for PDMS microspheres have been suggested in the literature. Possible uses include sensors, actuators, and additives for polymer resins. PDMS microspheres may also be suitable as materials for extraction and chromatography and for biomedical applications, such as drug delivery and controlled release. These applications have not yet been well explored, at least in part due to the lack of versatility and control inherent in existing methods to fabricate PDMS microspheres.

BRIEF SUMMARY

A method of making silicone microspheres that allows for unprecedented control over particle size, size distribution and composition is described herein.

The method comprises nebulizing a silicone precursor solution comprising one or more oligomeric dimethylsiloxanes, a catalyst and a solvent into an aerosol comprising a plurality of droplets. Each droplet comprises the silicone precursor solution. The droplets are entrained in a gas which is flowed through a reaction zone comprising light energy and/or heat energy. Upon exposure of the droplets to the light energy and/or the heat energy, the solvent evaporates and the one or more oligomeric dimethylsiloxanes are polymerized. Thus, silicone microspheres are formed from the droplets of the aerosol.

BRIEF DESCRIPTION OF THE DRAWINGS

FIG. 3C shows an SEM image of PDMS microspheres obtained using a PDMS precursor concentration of 20 mg $mL^{-1}$ in hexanes, and FIG. 3D shows the size distribution of the microspheres as determined using the Image J software package, where N indicates the total number of microspheres counted.

FIG. 3E shows an SEM image of PDMS microspheres obtained using a PDMS precursor concentration of 100 mg $mL^{-1}$ in hexanes, and FIG. 3F shows the size distribution of the microspheres as determined using the Image J software package, where N indicates the total number of microspheres counted.

FIG. 3G shows an SEM image of PDMS microspheres obtained using a PDMS precursor concentration of 1 mg $mL^{-1}$ in hexanes, and FIG. 3H shows the size distribution of the microspheres as determined using the Image J software package, where N indicates the total number of microspheres counted.

FIG. 4A is a photograph of (left) a dispersion of magnetic silicone microspheres and (right) the same dispersion when a magnet is applied to the side of the beaker.

FIG. 4B is an SEM image of a magnetic PDMS microsphere on copper foil showing the path of an energy-dispersive x-ray spectroscopy (EDS) line scan across the particle.

FIG. 4C shows the EDS line scan obtained from the microsphere of FIG. 4B and indicating Si and Fe concentrations across the particle.

FIG. 4D shows a transmission electron microscopy (TEM) image of a monolithic PDMS microsphere, and FIG. 4E is a TEM image of a magnetic core-shell microsphere.

FIGS. 5A-5C show TEM images of PDMS microspheres showing one, two and multiple iron cores, respectively.

FIG. 6A shows a TEM image of a magnetic core-shell PDMS microsphere obtained with a precursor solution containing a 1:1 v/v ratio of PDMS precursor (20 mg/mL hexane) to Magnafluid.

FIG. 6B shows a TEM image of a magnetic core-shell PDMS microsphere obtained with a precursor solution containing a 3:1 v/v ratio of PDMS precursor (20 mg/mL in hexane) to Magnafluid.

FIGS. 6C-6E show size distributions of PDMS microspheres obtained with a precursor solution containing, respectively: a PDMS precursor at a concentration of 20 mg/mL in hexane; a precursor solution containing a 1:1 v/v ratio of PDMS precursor (20 mg/mL in hexane) to Magnafluid; and a precursor solution containing a 3:1 v/v ratio of PDMS precursor (20 mg/mL in hexane) to Magnafluid.

FIG. 7A shows a TEM image of a core-shell silicone microsphere having a PS core (lighter region) surrounded by a silicone shell (darker region).

FIG. 7B shows a SEM image of a number of core-shell silicone microspheres with an inset showing a magnified view of a single microsphere.

FIG. 7C shows a FTIR difference spectrum obtained by subtracting the FTIR spectrum of monolithic PDMS microspheres from an FTIR spectrum obtained from a PS-PDMS core-shell microsphere to reveal the peaks (labeled) characteristic of PS.

FIGS. 8A-8C show SEM images (top) and size distribution plots (bottom) for PS-PDMS core-shell microspheres synthesized using silicone precursor solutions containing, respectively: (a) only a PDMS precursor; (b) a 10:1 ratio of PDMS:PS; and (c) a 7.5:1 ratio of PDMS:PS, where in each case the PS molecular weight ($M_W$) is 35,000, and the total polymer precursor concentration in the nebulized solution is 22 mg/mL in toluene.

FIGS. 8D-8F show SEM images (top) and size distribution plots (bottom) for PS-PDMS core-shell microspheres synthesized using silicone precursor solutions containing, respectively: (d) a 5:1 ratio of PDMS:PS; (e) a 3:1 ratio of PDMS:PS; and (f) a 2:1 ratio of PDMS:PS, where in each case the PS molecular weight ($M_W$) is 35,000, and the total polymer precursor concentration in the nebulized solution is 22 mg/mL in toluene.

DETAILED DESCRIPTION

Described herein is a simple, scalable and continuous process for making micrometer-sized silicone spheres using spray pyrolysis (e.g., ultrasonic spray pyrolysis or USP). This method is designed to overcome the limitations of existing synthesis techniques by isolating silicone oligomers into micrometer-sized spray droplets for polymerization, therefore nearly eliminating coalescence and aggregation during microsphere formation. Due to the very low surface energy of silicones, such isolation is not possible with traditional emulsion polymerizations, which produce only large, polydisperse silicone spheres. The microspheres that result from USP may have much smaller diameters and narrower size distributions compared to microparticles obtained using conventional synthetic methods. A variety of silicone microspheres, including magnetic, fluorescent, copolymeric and core-shell particles, with diameters ranging from <500 nm to about 30 μm and a relatively narrow size distribution, may be produced by USP. The size and composition of the microspheres may be adjusted by altering the concentration and choice of precursors in the silicone precursor solution.

Figure 1:
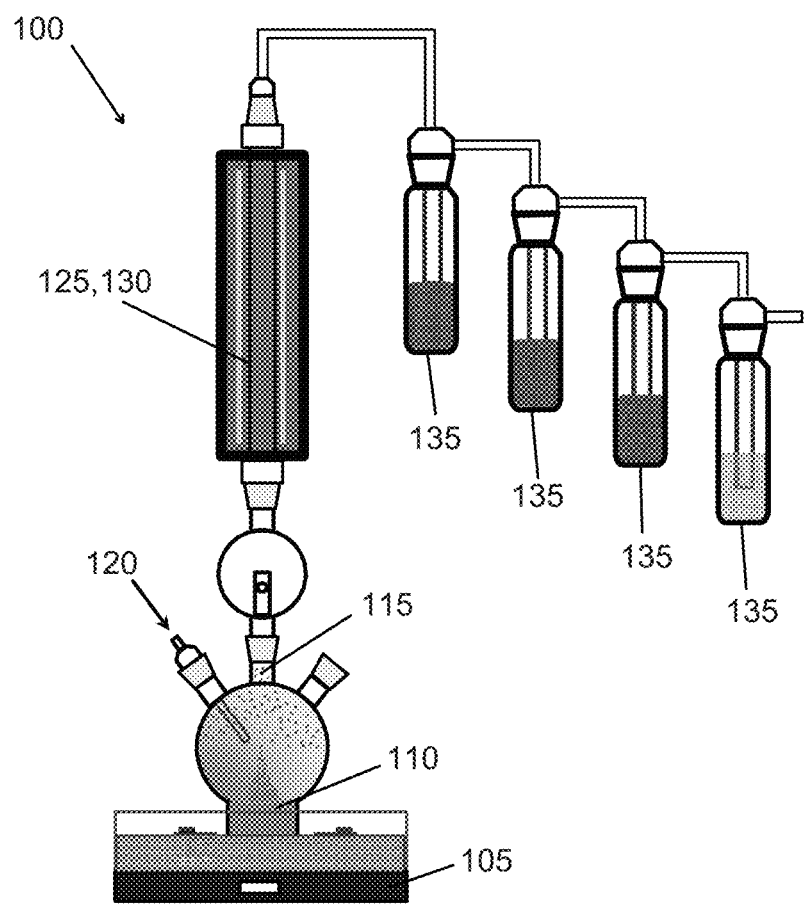
FIG. 1 shows an experimental set-up for ultrasonic spray pyrolysis (USP).

The USP method is described in reference to FIG. 1, which shows a schematic of an exemplary apparatus 100 that may be employed to fabricate silicone microspheres. The method entails nebulizing a silicone precursor solution 110 into an aerosol or mist 115 comprising a plurality of droplets, where each droplet comprises the silicon precursor solution 110. The nebulization may be carried out by exposing the silicone precursor solution 110 to ultrasonic energy. As illustrated in FIG. 1, a simple ultrasonic transducer 105 operating at a suitable frequency (e.g., 1.7 MHz) may be used. The silicone precursor solution 110 may include one or more oligomeric dimethylsiloxanes, a catalyst and a solvent. The oligomeric dimethylsiloxane(s) in the silicone precursor solution may alternatively be referred to as PDMS precursor(s).

The aerosol 115 may then be entrained in a gas 120 and carried with the gas 120 through a reaction zone 125 that is exposed to light energy or heat energy. As the aerosol 115 travels through the reaction zone 125, the solvent evaporates and the one or more oligomeric dimethylsiloxanes are polymerized and crosslinked. The catalyst (e.g., a Pt or Sn catalyst) may promote the crosslinking reaction. Isolated silicone microspheres (e.g., see FIG. 2A) may thus be formed from the droplets of the aerosol 115. It should be noted that the term "microsphere" is used without limitation to refer to particles produced by the method that are substantially spherical, somewhat spherical, or, in some cases, nonspherical.

Typically, the gas 120 in which the aerosol 115 is entrained is an inert gas such as Ar or He. The gas 120 may be flowed through the reaction zone 125 at a volumetric flow rate of from about 0.1 slpm to about 2 slpm (where slpm refers to standard liters per minute), or from about 0.2 slpm to about 1 slpm. Typically, a residence time of the aerosol 115 in the reaction zone 125 is from about 10 s to about 100 s, but could be as short at 0.1 s or as long as 500 s in a smaller or larger apparatus.

Referring to FIG. 1, the reaction zone 125 may be, for example, a tubular passage 130 heated to a temperature sufficient to promote solvent evaporation and polymerization. The temperature is typically in the range from about 200° C. to about 400° C., or from about 250° C. to about 350° C.

The silicone microspheres formed by the polymerization reaction may be collected in one or more bubblers 135 (as shown) comprising either an organic or aqueous liquid, or in an electrostatic precipitator, or by use of gas filtration using a filter with pore dimensions smaller than the microspheres. If bubblers are used, each may contain a solvent such as ethanol. Ethanol may be suitable because it is miscible with hexane, which may be used as the solvent in the silicone precursor solution. Ethanol is also able to dissolve any uncured siloxanes and readily disperse the silicone microspheres. After collection, the microspheres may further be washed, centrifuged and/or resuspended (e.g., via sonication) in a suitable solvent, such as ethanol, toluene and/or hexanes.

Ultrasonic spray pyrolysis can produce silicone microspheres with narrow size distributions and controllably low average diameters (e.g., less than about 2 μm in some cases). Because each precursor droplet acts as its own isolated microreactor, the chance of prepolymer coalescence and aggregation is reduced, and the resultant microspheres have much smaller diameters and narrower size distributions as compared to particles obtained using conventional synthetic methods.

Figure 2A:
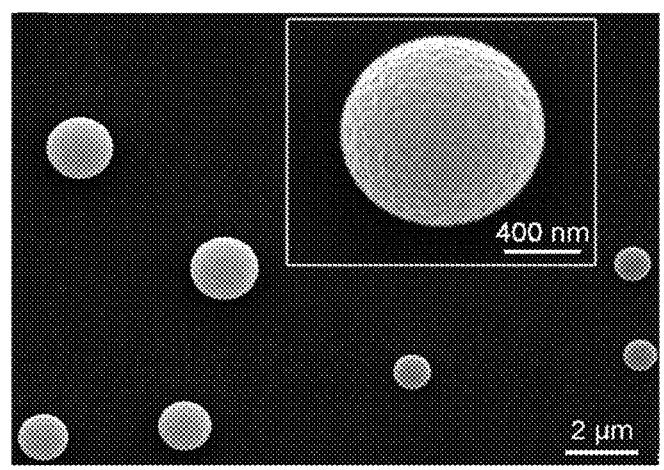
FIG. 2A shows a scanning electron microscope (SEM) image of polydimethylsiloxane (PDMS) microspheres prepared using ultrasonic spray pyrolysis; the inset shows an expanded view of a microsphere.
Figure 2B:
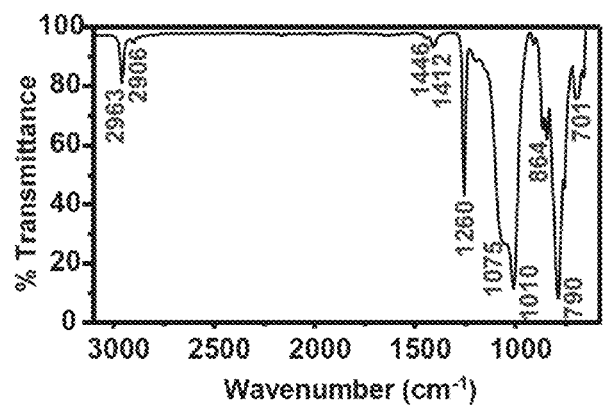
FIG. 2B shows attenuated total reflectance-Fourier transform infrared spectroscopy (ATR-FTIR) data of the silicone microspheres of FIG. 2A
Figure 2C:
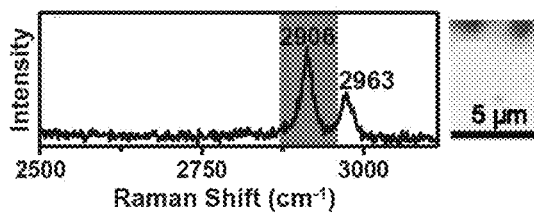
FIG. 2C shows a Raman spectrum of the silicone microspheres of FIG. 2A, where C—H stretching peaks (2906 and 2963 $cm^{-1}$) for PDMS are clearly evident.
Figure 2D:
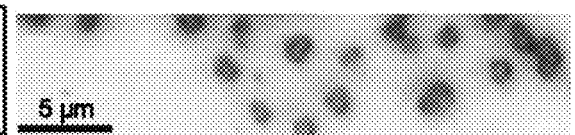
FIG. 2D shows an optical image of the silicone microspheres overlaid with Raman mapping showing the relative intensity of the C—H stretching peak (2906 $cm^{-1}$) highlighted in FIG. 2C.

FIG. 2A shows a scanning electron microscope (SEM) image of silicone microspheres fabricated using USP. The image shows well-formed spherical particles with minimal agglomeration. Fourier transform infrared spectroscopy (FTIR) data (shown in FIG. 2B) obtained from dried microspheres matches the infrared (IR) spectrum of PDMS reported in the literature. Raman mapping data shown in FIGS. 2C and 2D confirm that the PDMS signal originates from the microspheres and not from any residual unreacted PDMS precursor or nonspherical crosslinked PDMS. Also, thermo-gravimetric analysis (not shown) is consistent with that of bulk PDMS.

Figure 3A:
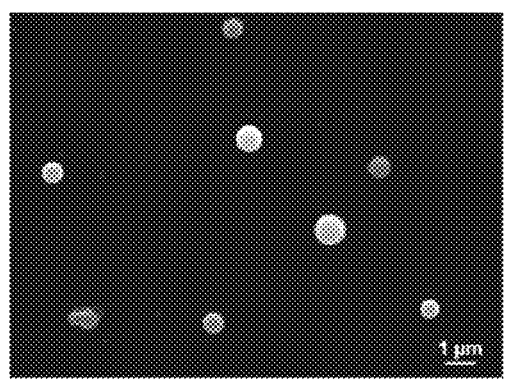
FIG. 3A shows an SEM image of PDMS microspheres obtained using a PDMS precursor concentration of 4 mg $mL^{-1}$ in hexanes.
Figure 3B:
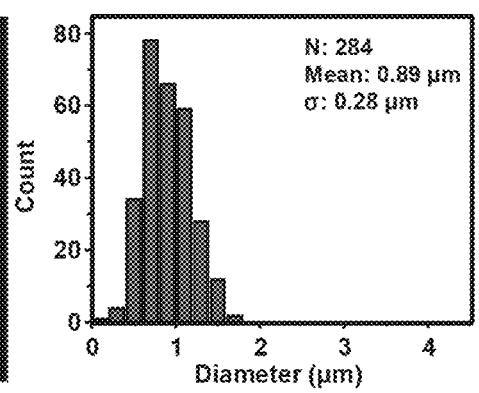
FIG. 3B shows the size distribution of the microspheres as determined using the Image J software package, where N indicates the total number of microspheres counted.

Experiments have revealed that the average particle size can be controlled by adjusting the concentration of the polymer precursor(s) in the precursor solution. Referring to FIGS. 3A and 3B, it can be seen that nebulization of a precursor solution containing oligomeric dimethylsiloxane at a concentration of 4 mg mL$^{-1}$ produced microspheres with an average diameter of about 0.89 μm. FIGS. 3C and 3D show that increasing the concentration of oligomeric dimethylsiloxane in the precursor solution to 20 mg mL$^{-1}$ can increase the microspheres' average diameter to about 1.2 μm, and FIGS. 3E and 3F show that further raising the concentration of oligomeric dimethylsiloxane in the precursor solution to 100 mg mL$^{-1}$ can increase the average diameter to about 2.0 μm. In all cases, the relative standard deviation is about 30%.

In the example of FIGS. 3E and 3F, where the concentration of oligomeric dimethylsiloxane was increased to about 100 mg mL$^{-1}$, the silicone precursor solution was very high in viscosity and thus it became more difficult to carry out the nebulization. A concentration of oligomeric dimethylsiloxane of 100 mg mL$^{-1}$ may be a practical upper bound in some cases and may be employed to produce silicone microspheres having an average diameter of about 2 microns. As indicated in FIGS. 3G and 3H, it is possible to produce microspheres having average diameters as small as about 500 nm, simply by further reducing the concentration of oligomeric dimethylsiloxane in the precursor solution (to about 1 mg mL$^{-1}$). It is believed that the average microsphere diameter may be reduced even further by nebulizing more dilute precursor solutions. Based on the above-described data, it is believed that a concentration of oligomeric dimethylsiloxane of about 0.1 mg mL$^{-1}$ in the silicone precursor solution may be employed to produce silicon microspheres having an average diameter as small as about 100 nm.

Generally speaking, it is envisioned that the silicone microspheres may have an average diameter in the range of from about 0.1 micron (100 nm) to about 30 microns. More typically, due to the difficulty in nebulizing highly viscous precursor solutions, the average diameter is about 20 microns or less, about 10 microns or less, about 5 microns or less, or about 2 microns or less. Typically, the average diameter of the silicone microspheres is at least about 0.1 micron, at least about 0.3 micron, at least about 0.5 micron, or at least about 1 micron. As discussed above, size control of the microspheres may be effected by varying the concentration of the silicone precursor(s) in the silicone precursor solution.

The concentration of the one or more oligomeric dimethylsiloxanes in the precursor solution may be at least about 0.1 mg mL$^{-1}$, at least about 0.5 mg mL$^{-1}$, at least about 1 mg mL$^{-1}$, or at least about 5 mg mL$^{-1}$, depending at least in part on the desired size of the resulting microspheres. Typically, to avoid excessive viscosity of the precursor solution which may hinder nebulization, the concentration of the one or more oligomeric dimethylsiloxanes is about 150 mg mL$^{-1}$ or less, about 100 mg mL$^{-1}$ or less, about 50 mg mL$^{-1}$ or less, about 20 mg mL$^{-1}$ or less, or about 10 mg mL$^{-1}$ or less.

In some embodiments, the silicone microspheres produced by USP as described herein may consist essentially of silicone and any residual impurities from the fabrication process. In other embodiments, the silicone microspheres may have a core-shell structure, where the shell comprises silicone and the core comprises a core material different from silicone. The core material may be an organic or inorganic material in the solid, liquid or gas phase. Such microspheres may be referred to as core-shell silicone microspheres, or more simply as core-shell microspheres.

The core material may comprise a dye or fluorophore, a polymer, an oxide, a metal, a semiconductor, carbon, ionic salts, and/or a pharmaceutical agent or active pharmaceutical ingredient (API). Exemplary core materials may include, for example, Nile Red, Rodamine 6G, polyethylene (PE), polystyrene (PS), polyethylene glycol, iron oxide (e.g., magnetite), silica, alumina, aluminasilicates, gold nanospheres or nanorods, silver nanoparticles, carbon black, carbon nanotubes, graphene, ammonium nitrate, warfarin, ketoprofen, and/or diltiazem.

Core-shell microspheres may be fabricated by adding a suitable core material precursor to the silicone precursor solution. In one example, the core material precursor may take the form of a suspension of nanoparticles comprising the core material. In another example, such as when the core material comprises a polymer, the core material precursor may comprise monomers or oligomers of the polymer. Typically, a weight ratio of the core material precursor to the one or more oligomeric dimethylsiloxanes in the silicone precursor solution is from about 1:20 to about 1:1. In some cases, the weight ratio may also be in the range from about 1:10 to about 1:2.

Typically, the average size or diameter of the core ranges from about 50 nm (0.05 micron) to about 2 microns and may be at least about 0.05 micron, at least about 0.1 micron, or at least about 0.3 micron in average diameter. The core may also be about 2 microns or less, about 1 micron or less, or about 0.5 micron or less in average diameter. The size of the core relative to the total size of the microsphere determines the thickness of the shell. Accordingly, an increase in the volume of the core may correspond to a decrease in the thickness of the shell, and a decrease in the volume of the core may lead to an increase in the thickness of the shell. The thickness of the shell may be an important variable for some applications; for example, in the case of core-shell microspheres with drug delivery applications, a reduced shell thickness may permit more rapid release of a material (such as a pharmaceutical agent) contained in the core. Typical shell thicknesses are in the range of from about 20 nm to about 2 microns, and more typically from about 100 nm to about 500 nm. The thickness of the shell may be determined by subtracting the diameter of the core from the diameter of the microsphere, and then dividing the result by two. As described below, the diameters may be determined using microscopy techniques.

In one example, the silicone microspheres may have a core-shell structure including magnetite ($Fe_3O_4$) as the core material. Such magnetic core-shell microspheres may find application as magnetic resonance imaging (MRI) contrast agents, in hyperthermia therapy, and/or for targeted drug delivery. USP may be employed to synthesize such particles by adding magnetite particles (e.g., colloidal $Fe_3O_4$ nanoparticles) to the silicone precursor solution.

For example, a commercially available colloidal suspension of 10 nm $Fe_3O_4$ nanoparticles (2% v/v Magna View Fluid, United Nuclear) may be added to a silicone precursor solution that includes oligomeric dimethylsiloxane at a concentration of 20 mg mL$^{-1}$. The exemplary USP process described above may be employed to form the magnetic core-shell microspheres. The synthesized particles may be collected in ethanol bubblers and then vacuum filtered, washed, and resuspended in a suitable solvent. The resulting core-shell microspheres are light brown in color and can be pulled from suspension using a magnet, as shown in FIG. 4A.

SEM images of the magnetic core-shell silicone microspheres show similar surface topography and microsphere size to nonmagnetic silicone microspheres, as can be seen by comparing FIG. 4B to FIG. 2A. An energy dispersive x-ray spectroscopy (EDS) line scan of the magnetic core-shell microspheres confirms the presence of both iron and silicon and reveals a core-shell morphology in which an iron-rich core is surrounded by a PDMS shell of about 200 nm in thickness, as shown in FIG. 4C. Transmission electron microscopy (TEM) images of the nonmagnetic silicone microspheres reveal that they are substantially uniform in density and composition throughout, as shown in FIG. 4D, while TEM images of the magnetic PDMS microspheres confirm the presence of a core-shell morphology, as shown in FIG. 4E.

The core-shell silicone microspheres typically have a single core but may in some cases have more than one core. Multiple cores may be more common when the precursor solution includes a lower concentration of the core material precursor relative to the PDMS precursor. The majority of the magnetic core-shell microspheres investigated here exhibited only a single magnetic core, but some of the magnetic microspheres were formed with multiple, smaller magnetic cores. FIGS. 5B-5C show microspheres having multiple (up to six) magnetic cores. At least about 75% of the core-shell magnetic microspheres produced in the experiments contained only a single magnetic core, as shown in FIG. 5A.

It has been found that magnetic core size can be altered by adjusting the concentration of the magnetic dopant in the precursor solution. Magnetic core-shell silicone microspheres fabricated using a higher concentration of magnetite particles have a larger magnetic core. The magnetic core-shell microsphere shown in FIG. 6A is obtained from a precursor solution containing a 1:1 v/v ratio of PDMS precursor (20 mg/mL hexane) to colloidal magnetite (Magnafluid), while the magnetic core-shell microsphere shown in FIG. 6B is obtained from a precursor solution containing a 3:1 v/v ratio of PDMS precursor (20 mg/mL hexane) to colloidal magnetite (Magnafluid). As can be seen by comparing the figures, the magnetic core of the microsphere shown in FIG. 6A is about 500 nm in diameter, while the magnetic core of the microsphere of FIG. 6B is less than 400 nm in diameter and accounts for a smaller portion of the volume of the microsphere.

In addition, a slight reduction in average microsphere diameter is observed for magnetic core-shell microspheres compared to nonmagnetic microspheres obtained with the same concentration of PDMS precursor in the silicone precursor solution. Similarly, a slight reduction in average microsphere diameter is observed for magnetic core-shell microspheres having a smaller magnetic core, as shown by the data in FIGS. 6C-6E. These figures show size distributions for, respectively, monolithic PDMS microspheres; magnetic core-shell microspheres obtained with a precursor solution containing a 1:1 v/v ratio of PDMS precursor (20 mg/mL in hexane) to Magnafluid; and magnetic core-shell microspheres obtained with a precursor solution containing a 3:1 v/v ratio of PDMS precursor (20 mg/mL in hexane) to Magnafluid.

In another example of core-shell silicone microspheres, the core material may comprise a polymer which different from PDMS. The polymer may be a high or low molecular weight ($M_w$) polymer. For example, in the case of a high $M_w$ polymer, the $M_w$ may be about 10,000 or greater, and in the case of a low $M_w$ polymer, the $M_w$ may be less than 10,000. The polymer may be uncrosslinked, in contrast to the PDMS. Suitable polymers may include any of those listed above. Such core-shell silicone microspheres may be made by including in the silicone precursor solution both a PDMS precursor and a precursor for the other polymer. For example, in the case of polystyrene (PS), the silicone precursor solution may include oligomeric dimethylsiloxanes, one or more crosslinking agents, and a catalyst along with dissolved linear polystyrene (e.g., $M_w$ 35,000). The silicone precursor solution may undergo USP processing as described above.

Referring to FIG. 7A, TEM images of the PS-PDMS microspheres reveal a core-shell morphology in which a non-crosslinked PS core (lighter region) is surrounded by a crosslinked silicone shell (darker region). The SEM images of FIG. 7B show well-dispersed core-shell PS-PDMS microspheres with minimal agglomeration and a wrinkled surface topography, which is characteristic of silicone microspheres. Fourier transform infrared spectroscopy (FTIR) analysis of the microspheres after washing shows the expected PDMS absorbances and those expected from the PS core. FIG. 7C shows a difference spectrum where the FTIR spectrum of solid PDMS microspheres was subtracted to reveal PS peaks at 3060, 3026, 2924, 2850, 1601, 1493 and 1452 cm$^{-1}$).

Generally speaking, the size of the core of a core-shell silicone microsphere may be controlled by changing the ratio of the silicone precursor to the core material precursor in the silicone precursor solution. Data suggest that the volume percentage of the core in the resultant core-shell microsphere may be approximately equal to the weight percentage of the core material precursor in the precursor solution (as determined based on the mass of the core material and the PDMS precursor). The volume percentages can be calculated based on the diameter of the core and the diameter of the entire microsphere, as determined, for example, from TEM images using Image J software. Referring to Table 1, which shows data for PS/PDMS core-shell particles, the volume of the PS core varies from 0% to 31% and is close to the weight percentage of the PS precursor employed in the silicone precursor solution. For low loading percentages of the PS precursor, the presence of multiple small cores in the microspheres is not uncommon; thus, the apparent volume percentage of PS as determined from measurement of a single core is lower than expected.

TABLE 1

Comparison of PS core size and microsphere diameter for PS-PDMS microspheres synthesized using USP from precursor solutions with different ratios of PDMS:PS (MW 35,000)

| | Precursor Solution | | | Final Product | |
|---|---|---|---|---|---|
| Ratio of PDMS:PS[a] | Total [polymer] (mg/mL) | wt %[b] PDMS | wt %[b] PS | Average diameter[c] (nm) | Vol % PS[c] |
| PDMS only | 22 | 100 | 0 | 850 ± 250 | 0 |
| 10:1 | 22 | 91 | 9 | 815 ± 280 | ~5[d] |
| 7.5:1 | 22 | 88 | 12 | 810 ± 220 | 14 |
| 5:1 | 22 | 83 | 17 | 800 ± 230 | 15 |
| 3:1 | 22 | 75 | 25 | 830 ± 260 | 22 |
| 2:1 | 22 | 67 | 33 | 800 ± 240 | 31 |

[a]mass ratio of polymers in precursor solution
[b]wt % of total polymer weight
[c]determined from Image J analysis of TEMs
[d]single core vol %; multiple cores also observed.

Spray pyrolysis allows for independent control over core diameter and overall microsphere diameter. The average diameter of a core-shell microsphere produced by USP may be determined by the total concentration of polymer precursors in the silicone precursor solution, and not by the ratio of the PDMS precursor to the core material precursor. As shown by the micrographs and particle size data of FIGS. 8A-8F as well as Table 1, microspheres prepared from silicone precursor solutions containing different ratios of polymer precursors (PDMS:PS) but having a constant total concentration of the precursors (22 mg mL$^{-1}$ in toluene) exhibit a consistent average microsphere diameter (about 0.8 micron in these examples), independent of the precursor ratio.

Figures 9A, 9B:
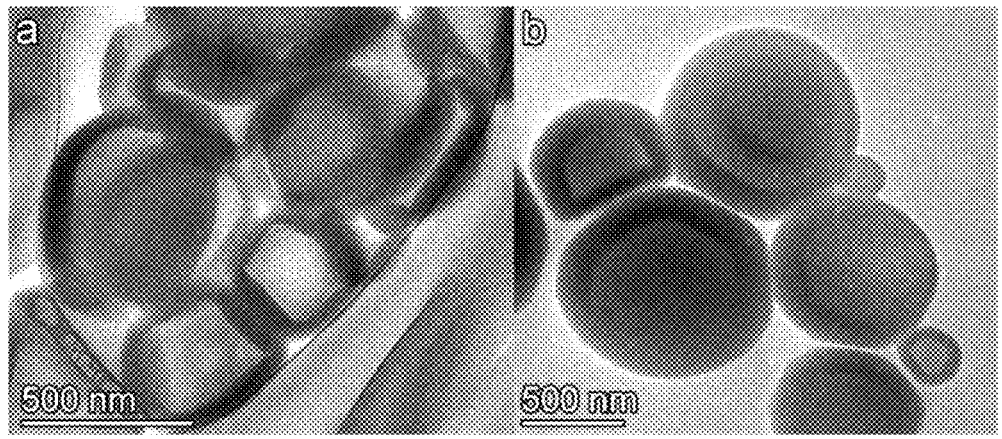
FIGS. 9A-9D show TEM images of core-shell silicone microspheres where the core material comprises, respectively: (a) liquid PEG synthesized using USP from a precursor solution containing a 1:1 ratio of PDMS (Sylgard 184):PEG ($M_W$ 900) with total polymer precursor concentration of 22 mg mL$^{-1}$ in toluene; (b) liquid PS synthesized using USP from a precursor solution with a 5:1 ratio of PDMS (Sylgard 184):PS ($M_W$ 800) with total polymer precursor concentration of 22 mg mL$^{-1}$ in toluene; (c) PS synthesized using USP from a precursor solution with a 5:1 ratio of PDMS (Gelest VDT-123):PS ($M_W$ 35,000) with total polymer precursor concentration of 22 mg mL$^{-1}$ in toluene; and (d) Cu(NO$_3$)$_2$ prepared using USP from a precursor solution with silicone oligomers (Sylgard 184) and Cu(NO$_3$)$_2$ dissolved in THF.
Figures 9C, 9D:
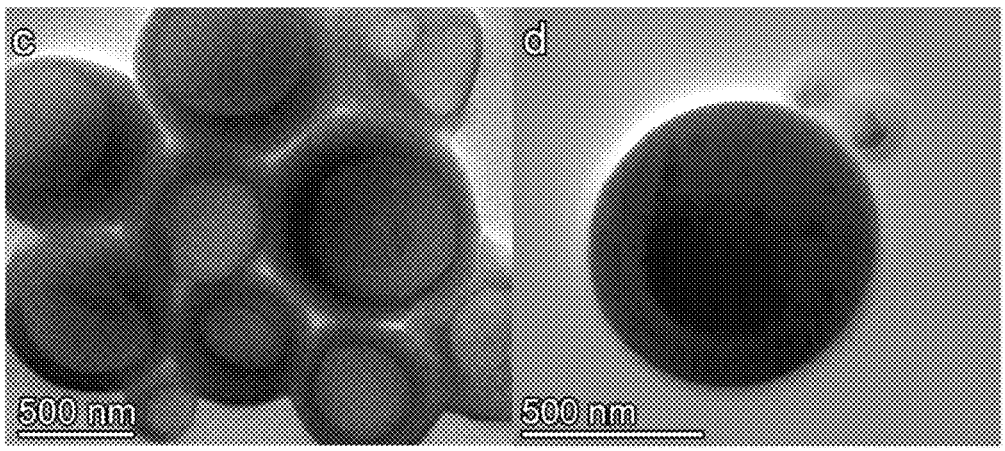

Examples of other types of core-shell microspheres that may be produced by USP include microspheres comprising liquid cores of low molecular weight polyethylene glycol or polystyrene (FIGS. 9A-9B), microspheres that use other silicone formulations (e.g., different crosslinking densities) as the encapsulating shell (FIG. 9C), and microspheres with ionic salt cores (FIG. 9D).

The silicone microspheres may in some embodiments be doped with a chemically responsive or fluorescent dye. Whether or not the dye is confined within the microsphere appears to depend on how the dye is incorporated into particle; if the dye is included in the silicone precursor solution prior to nebulization and crosslinking, the crosslinked microspheres may be able to physically trap the dye, possibly within small cross-linked cavities. If the dye is added to the microspheres after crosslinking, the dye may not be well confined within the particles and may diffuse from the crosslinked polymer.

Figure 10A:
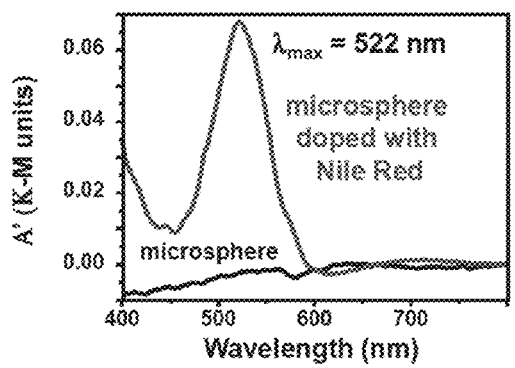
FIG. 10A shows the diffuse reflectance spectrum of Nile red-doped PDMS microspheres (curve with peak) and non-fluorescent PDMS microspheres (curve without peak), where the peak at 522 nm indicates successful inclusion of Nile red in the microspheres.
Figure 10B:
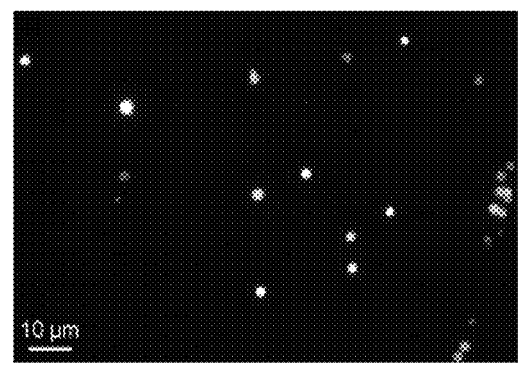
FIG. 10B shows a fluorescence image of Nile red-doped PDMS microspheres.
Figure 10C:
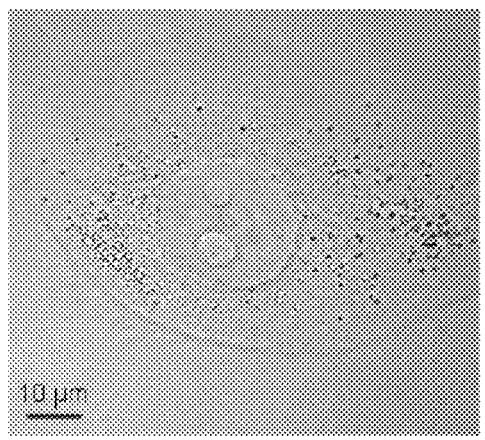
FIG. 10C shows a bright field image of a cell that has taken up microspheres.
Figure 10D:
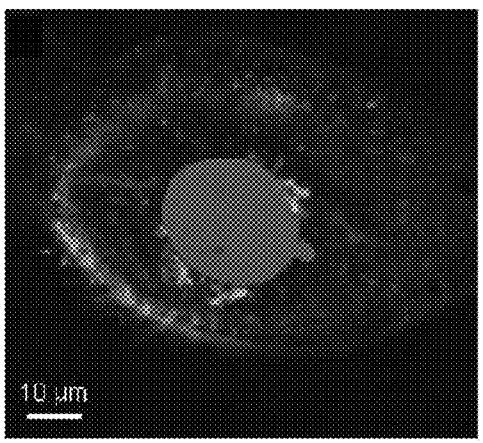
FIG. 10D shows a fluorescence image of the cell shown in FIG. 10C.
Figure 10E:
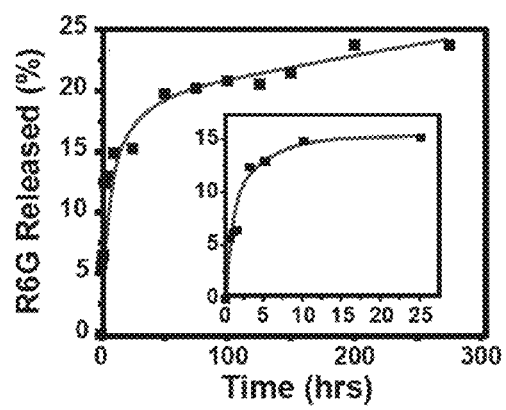
FIG. 10E is a plot showing extended release of a small molecule, Rhodamine 6G, from PDMS microspheres into phosphate buffered saline, where the release is reported as percent R6G released of total loaded R6G.

As proof of concept, USP is employed to fabricate PDMS microspheres doped with the fluorescent dye Nile red. To produce such fluorescent microspheres, Nile red (0.062 M) is added to a 20 mg mL$^{-1}$ silicone precursor solution, and USP synthesis is performed as described previously. The red-colored microspheres are washed (e.g., three times with 50 mL EtOH, and 3 times with 50 mL hexanes), dispersed in hexanes and stored. The microspheres were found to retain their fluorescence even after washing and storage for over one month in ethanol. The diffuse reflectance spectrum of FIG. 10A obtained from dried fluorescent microspheres shows an absorption band at 522 nm that is absent in the non-fluorescent microspheres, indicating the successful inclusion of Nile red. Fluorescence images of the Nile red doped microspheres show localized fluorescence, as indicated in FIG. 10B. FIGS. 10C-10E are referred to below.

Figure 11:
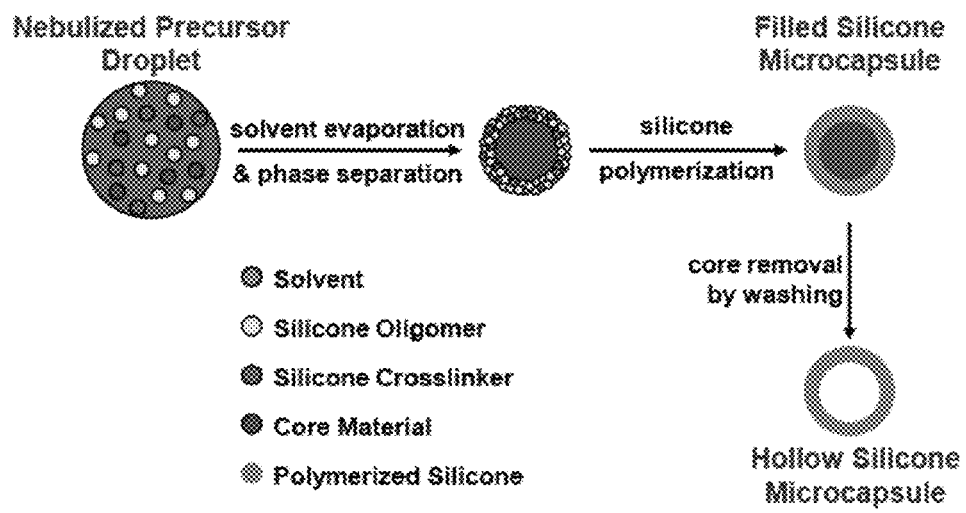
FIG. 11 is a schematic illustration of processes that occur during USP synthesis of core-shell and hollow silicone microspheres.
Figure 12A:
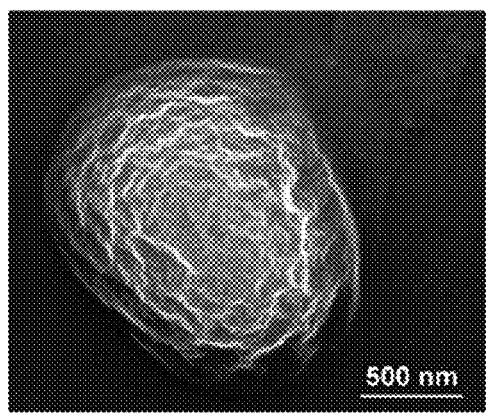
FIGS. 12A and 12B show SEM and TEM images, respectively, of foamed silicone microspheres prepared via USP using in situ hydrogen evolution during Sn$^{IV}$ catalyzed condensation of silanol- and hydride-functionalized PDMS oligomers.
Figure 12B:
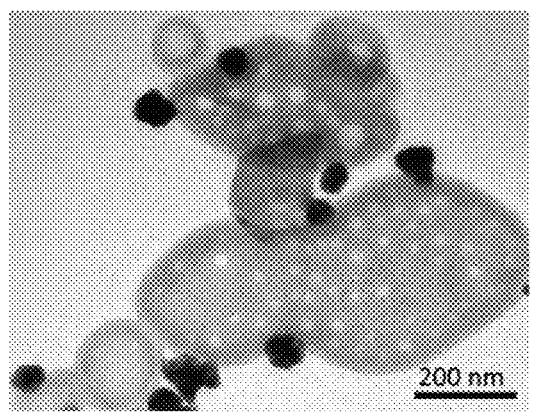

USP technology may also be employed to fabricate hollow silicone microspheres. In one approach, which may be referred to as sacrificial templating, the core may be removed from a core-shell microsphere after USP synthesis. For example, referring to FIG. 11, a USP-prepared silicone microsphere having a core-shell structure may be exposed to a suitable solvent for a time sufficient to dissolve the core, thereby producing a hollow silicone microsphere that typically includes a single internal void. Alternatively, the hollow silicone microspheres may be formed in-situ during USP synthesis. This latter approach may entail hydrogen evolution during polymerization. For example, hydrogen evolution may occur during $Sn^{IV}$ catalyzed condensation of silanol and hydride functionalized silicone oligomers. Typically, the in-situ approach yields microspheres having a foamed microstructure. Exemplary foamed silicone microspheres are shown in FIGS. 12A-12B.

An example of the preparation of hollow silicone microspheres via sacrificial templating is demonstrated using PS-PDMS core-shell microspheres having a non-crosslinked PS core. The PS core can be removed after the USP synthesis by washing with acetone, a solvent which readily dissolves PS and slightly swells PDMS. The successful removal of the PS core is dependent on both PS chain length and PDMS shell thickness. The higher the molecular weight of the PS in the core, the longer it takes to dissolve the PS out of the microsphere. Likewise, the thicker the silicone shell or the more highly crosslinked the shell, the longer it takes to dissolve away the core PS.

Figure 13A:
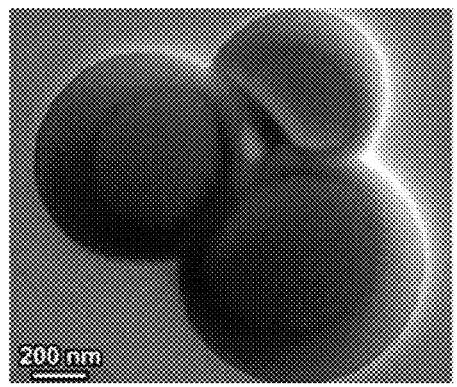
FIGS. 13A and 13B show TEM images of PS-PDMS core-shell microspheres (fabricated with 2:1 precursor ratio PDMS:PS ($M_W$ 35,000)) after exposure to acetone for 15 minutes and 3 days, respectively, to effect removal of the PS core.
Figure 13B:
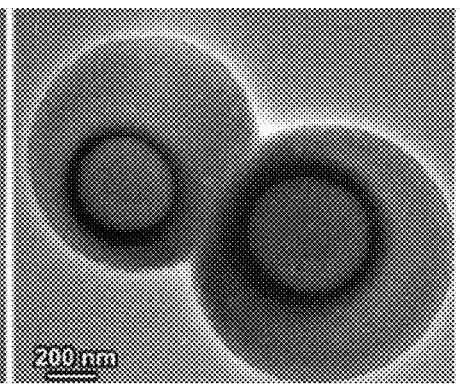
Figures 13C, 13D:
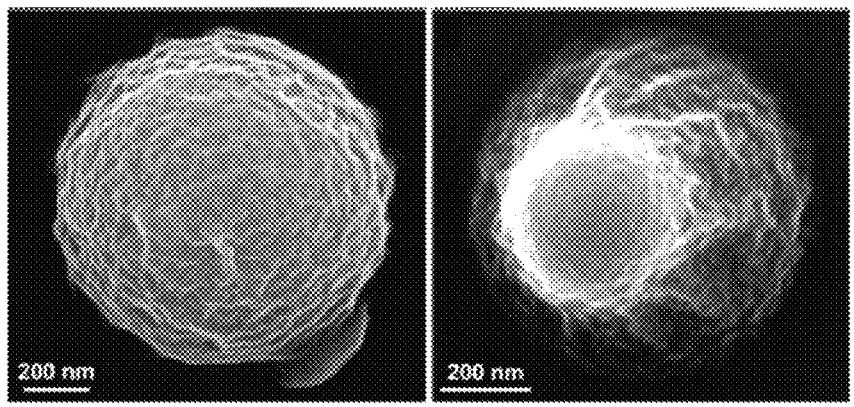
FIGS. 13C and 13D show SEM images of the microspheres of FIGS. 13A and 13B, respectively.

For microspheres prepared with a high molecular weight polymer as the core material, diffusion of the large polymer chains through the crosslinked PDMS shell may occur slowly. For example, in the case of core-shell microspheres prepared having a 2:1 ratio of PDMS (Sylgard 184):PS ($M_W$ 35,000), prolonged exposure to acetone (e.g., 3 days) reduces the size of PS core but it still accounts for about 8 vol. % of the microsphere (compared to an initial fraction of about 31 vol. %). The change in core size can be seen in FIGS. 13A-13D, where FIGS. 13A and 13C show the particle after 15 minutes of exposure to acetone, and FIGS. 13B and 13D show the particle after 3 days of exposure to acetone.

Figures 13E, 13F:
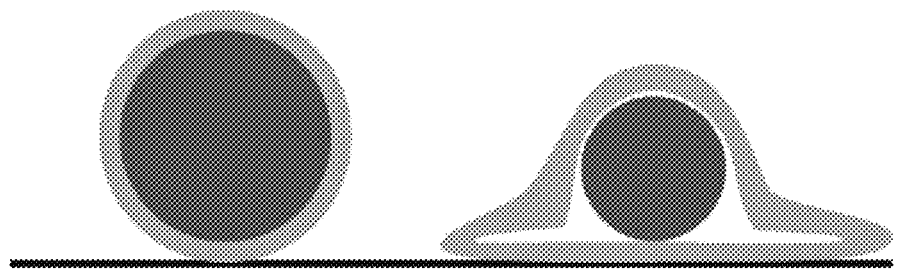
FIGS. 13E and 13F show a cross-sectional schematic of a core-shell microsphere prior to core removal (e) and after partial removal of the core and collapse of the shell (f), respectively.
Figures 14A, 14B, 14C:
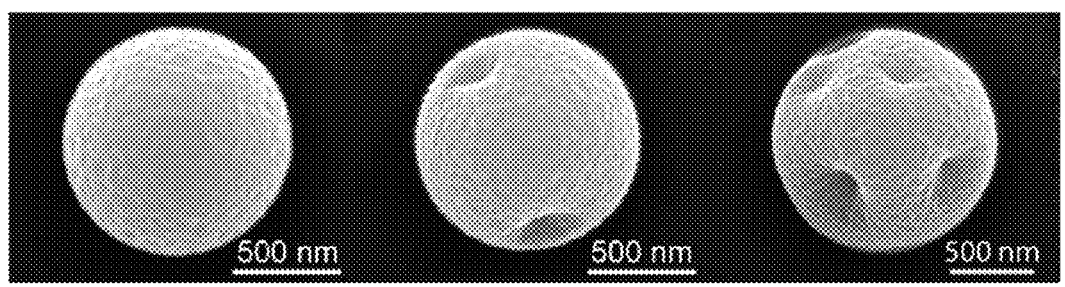
FIGS. 14A-14E show SEM images of hollow silicone microspheres made from different ratios of PDMS:PS (Mw 800): (a) PDMS only; (b) 10:1; (c) 5:1; (d) 3:1; and (e) 2:1.
Figures 14D, 14E:
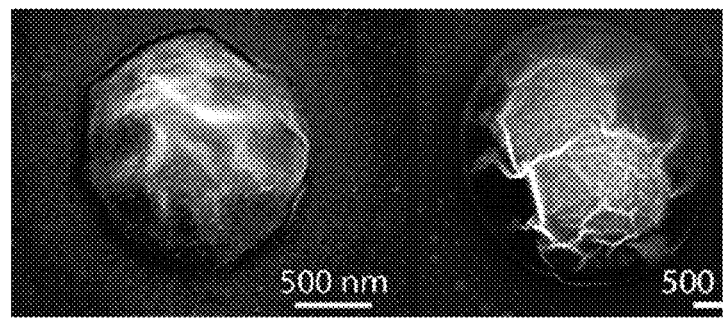

Referring to the schematics of FIGS. 13E and 13F, after USP, the core-shell microspheres may have a uniform, spherical morphology; however, after partial core removal, the morphology of the microsphere may resemble a collapsed shell that forms a "skirt" around a small solid spherical core (e.g., the remaining PS core). For microspheres prepared with a thick PDMS shell (e.g., using a 10:1 ratio of PDMS:PS (MW 35,000)), even after prolonged Soxhlet extraction with either acetone or toluene, removal of the PS core may still be incomplete.

For comparison, if a low molecular weight polymer, such as PS having a $M_W$ of 800, is used as the core material during USP synthesis, similar PS-PDMS core-shell microspheres may be produced, but the core may be much more easily removed. The PS chains that make up the core of these microspheres may be, on average, only seven to eight monomer units in length (compared to n~335 for PS with a $M_W$ of 35,000); thus, they are able to diffuse through the PDMS shell much more readily. For example, simply collecting the USP-synthesized microspheres in ethanol bubblers may be sufficient to fully remove the PS core and produce hollow silicone microspheres.

SEM images of hollow microspheres produced from PS-PDMS core-shell microspheres show surface indentations where the elastomeric silicone has collapsed into the internal void cavities. See FIGS. 14A-14E. A hollow microsphere with a significant internal void volume (e.g., greater than about 5% to 10% of the total microsphere volume) can collapse upon itself because the shell is not rigid. The internal void is, however, refillable. Only hollow microspheres made from a very thick shell (e.g., using at least a 10:1 ratio of PDMS:PS) are able to maintain internal void cavities without collapse. FTIR data from the hollow microspheres shows only peaks characteristic of PDMS and does not show any peaks characteristic of PS.

Among the many possible uses of hollow silicone microspheres, environmental applications may prove especially important, given the biodegradability and low toxicity of PDMS. There is an urgent and pressing need for oil spill remediation materials, for example. Porous materials are an ideal choice for oil spill remediation due to their high surface area to volume ratio which can produce high absorption capacities and fast absorption kinetics. Due to their high oleophilicity and hydrophobicity, cost-effectiveness, and high chemical and thermal stability, porous silicone materials may be an attractive choice as a spill remediation material.

EXAMPLES

Exemplary Ultrasonic Spray Pyrolysis (USP) Process

A 1.7 MHz piezoelectric transducer is used to nebulize a precursor solution (e.g., 20 mg/mL PDMS precursor in hexanes) into a mist of micrometer-sized droplets. The aerosol is carried into and through a heated furnace tube via an inert argon stream at 0.4 slpm. The droplets act as micron-sized reaction vessels; the hexanes solvent quickly evaporates and Sylgard 184 precursors, catalyzed by a Pt catalyst, crosslink in the heated furnace (300° C.). The polymerization of PDMS happens very quickly, as the residence time in the furnace is only ~70 seconds. Each droplet acts as an individual reaction vessel and individual microspheres are produced. The cured PDMS microspheres are collected in ethanol bubblers. Following collection, the ethanol/microsphere suspension is centrifuged at ~5000 rpm for 60 minutes until the microspheres formed a pellet in the bottom of the centrifuge tube. The ethanol supernatant is decanted, fresh ethanol (~40 mL) is added, and the microspheres are re-dispersed via sonication. This washing protocol is repeated three times, and the washed microspheres are suspended in hexanes and stored.

Preparation of Magnetic Core-Shell PDMS Microspheres

Sylgard 184, a PDMS precursor, can be obtained from Dow Corning as a two-part kit. The silicone precursor solution contains the PDMS precursor in a 2:1 base:accelerator ratio. Colloidal $Fe_3O_4$ nanoparticles (~10 nm) can be obtained as a stable suspension under the tradename MagnaView Fluid from United Nuclear. The fluid includes 5% magnetite, 10% surfactant (oleic acid), and 85% oil carrier by volume.

Preparation of Copolymeric Microspheres

Polydiphenyl-co-polydimethylsiloxane microspheres are synthesized using a precursor solution containing 1.9 v/v % 15-17% diphenylsiloxane-dimethylsiloxane copolymer vinyl terminated (PDV-1625, Gelest Inc.), 0.07 v/v % 25-35% methylhydrosiloxane-dimethylsiloxane copolymer (HMS-301, Gelest Inc.), and 0.02 v/v % platinum-divinyltetramethyl-disiloxane complex in xylene (SIP6831.2LC, Gelest Inc.) in hexanes.

Polytrifluoropropyl-co-polydimethylsiloxane microspheres are synthesized using a precursor solution containing 1.4 v/v % 35-45% trifluoropropylsiloxane-dimethylsiloxane copolymer vinyl terminated (FMV-4035, Gelest Inc.), 0.7 v/v % HMS-301, 0.02 v/v % SIP6831.2LC in hexanes.

Polydimethylsiloxane-co-poly(propylene oxide-ethylene oxide) microspheres are synthesized using a precursor solution containing 1.4 v/v % 30% non-silicone dimethylsiloxane-vinylmethylsiloxane-(propylene oxide-ethylene oxide) block copolymer (DBP-V102, Gelest Inc.), 0.7 v/v % HMS-301, 0.02 v/v % SIP6831.2LC in toluene. All other reagents were purchased from Sigma Aldrich and used as received without further purification.

Cell Uptake of Fluorescent Microspheres

The fluorescent Nile red-doped silicone microspheres described above were subsequently used for cell uptake experiments. The fluorescent microspheres were isolated by centrifugation, washed with aqueous PBS, resuspended in the culture medium, and incubated with metastatic human breast cancer cells (MDA-MB-231) for 24 h before imaging with confocal fluorescence microscopy. Referring to FIGS. 10C-10E, the fluorescent microspheres are clearly evident in both bright field and fluorescence images and are localized to the cell cytosol, without further penetration into the cell nucleus. Thus, the USP-prepared PDMS microspheres may be candidates both for biological imaging and delivery of small molecules into cells.

Cytotoxicity of Microspheres

For biomedical applications, microspheres preferably have extremely low cytotoxicity. Accordingly, the cytotoxicity of silicone microspheres has been investigated. Using the MDA-MB-231 human breast cancer cell line, cellular incubation (for 24 h with PDMS microspheres under the same conditions used for the uptake experiments) produced extremely high cell viability (99%), even at the highest concentration tested (105 microspheres per cell). No statistical difference was seen among the four concentrations (approximately 100 microspheres/cell, 1000 microspheres/cell, 10,000 microspheres/cell, and 100,000 microspheres/cell) tested and the control. The extremely low cytotoxicity is consistent with the excellent biocompatibility exhibited by bulk PDMS, which is the material of choice for many biomedical devices.

Loading and Release of Small Molecules from Microspheres

The uptake of small hydrophobic molecules by bulk PDMS, including dyes and drugs, is a commonly reported problem for PDMS used in microfluidic applications. For drug delivery using microspheres, however, the strong sorption characteristics of PDMS could be advantageous. To that end, the loading and release of a small hydrophobic molecule, Rhodamine 6G (R6G), is investigated as a model to explore the potential of PDMS microspheres for drug delivery. R6G concentrations are easily quantified using UV-vis. Additionally, R6G has a partition coefficient similar to many active pharmaceutical agents. USP-prepared PDMS microspheres are loaded with R6G and the slow release of the small molecule from the microspheres is monitored while the microspheres are suspended in phosphate buffered saline at 37° C. For these studies, the R6G is loaded after the synthesis of the microspheres, which may be beneficial to avoid waste and loss of the pharmaceutical agent during preparation. For delayed release of pharmaceutical agents, the silicone microspheres may be useful; the investigation shows that R6G release into water is slow with only about 25% release after 200 h. In contrast, release into ethanol is fast and complete upon mixing. This may primarily be a result of the extreme hydrophobicity of PDMS and its poor wettability, given that the solubility of R6G in water is relatively high (about 20 mg mL$^{-1}$). Improved wettability may be achieved, however, with more polar silicone or copolymeric microspheres, which can be synthesized by either adding an additional component to the precursor solution or using post-synthetic modification of the microsphere surface.

Solvent, Fuel and Oil Absorption of Solid and Hollow Microspheres

Figure 15:
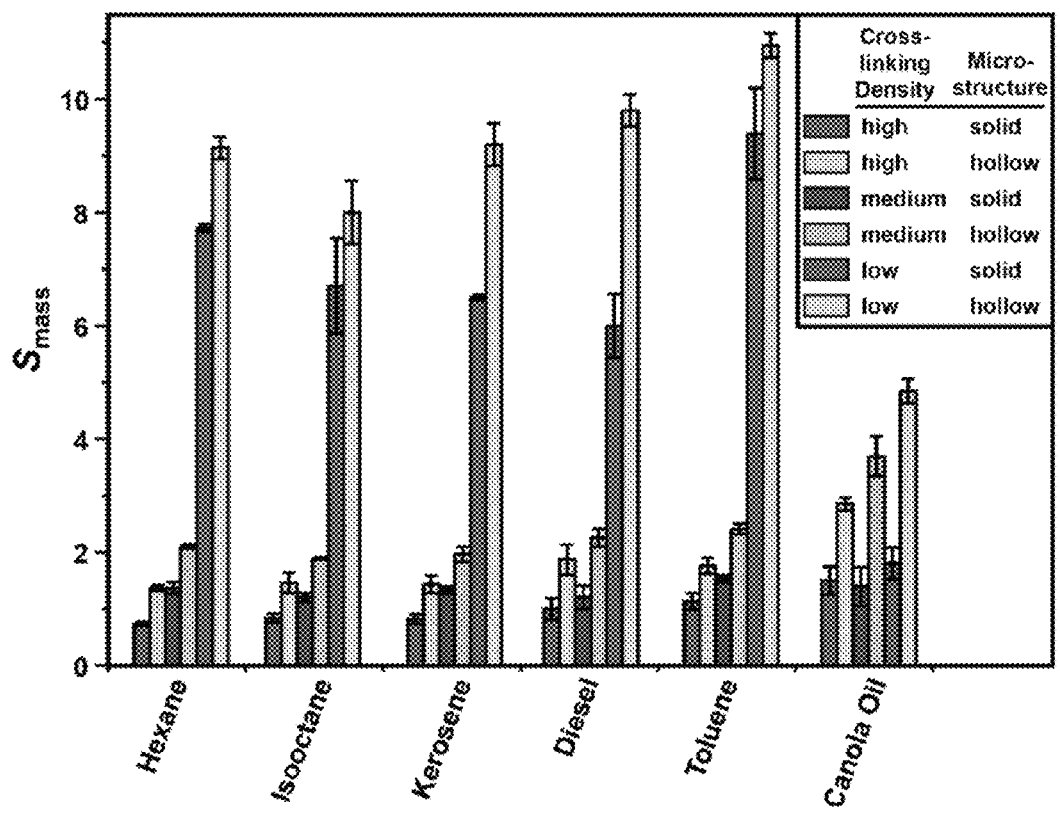
FIG. 15 shows solvent, fuel and oil absorption by solid and hollow silicone microspheres with different crosslinking densities.

Solvent, fuel, and oil absorption by the silicone microspheres is investigated as a function of crosslinking density for both solid and hollow microspheres. These results are summarized in FIG. 15. The mass of liquid absorbed per gram of oil absorbent ($S_{mass}$) is dependent on the silicone crosslinking density, the internal void volume of the microspheres, and the liquid chemical characteristics (e.g., the liquid's ability to swell silicone). In general, the hollow microspheres showed higher $S_{mass}$ values than the solid silicone microspheres with the same crosslinking density. In addition, silicone microspheres showed increasing $S_{mass}$ values with decreasing crosslinking. The highest oil absorption capacities observed were about 10 g liquid/g silicone. The hollow silicone microspheres have relatively uniform absorption among all liquids tested and have volume absorption capacities as high as 12 mL liquid/mL microsphere. Compared to other polysiloxane sorbents, the hollow microspheres are comparable in their oil scavenging capacity. Optimization of microsphere composition and microstructure by, for example, lowering crosslinking density and increasing internal void volume, is expected to increase absorption capacities further, observed with dye absorption studies.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

What is claimed is:

1. A method of making silicone microspheres, the method comprising:
   nebulizing a silicone precursor solution comprising one or more oligomeric dimethylsiloxanes, a catalyst and a solvent into an aerosol comprising a plurality of droplets, each droplet comprising the silicone precursor solution;
   entraining the droplets in a gas and flowing the gas through a reaction zone comprising light energy and/or heat energy,
   wherein, upon exposure of the droplets to the light energy and/or the heat energy, the solvent evaporates and the one or more oligomeric dimethylsiloxanes are polymerized, thereby forming silicone microspheres from the droplets of the aerosol.

2. The method of claim 1, wherein the one or more oligomeric dimethylsiloxanes are present in the silicone precursor solution at a concentration of no greater than about 150 mg/mL.

3. The method of claim 2, wherein the concentration is from about 0.1 mg/mL to about 100 mg/mL.

4. The method of claim 1, wherein nebulizing the silicone precursor solution comprises exposing the silicone precursor solution to ultrasonic energy.

5. The method of claim 1, wherein the gas comprises an inert gas.

6. The method of claim 1, wherein the gas is flowed through the reaction zone at a flow rate of from about 0.1 slpm to about 2 slpm.

7. The method of claim 1, wherein the reaction zone is heated to a temperature in the range of from about 200° C. to about 400° C.

8. The method of claim 1, wherein the droplets of the aerosol have a residence time in the reaction zone of from about 0.1 s to about 500 s.

9. The method of claim 1, wherein the catalyst comprises a Pt catalyst or a Sn catalyst, and wherein the solvent comprises an organic solvent.

10. The method of claim 1, further comprising, after forming the silicone microspheres, collecting the silicone microspheres in an apparatus selected from the group consisting of: one or more bubblers comprising an organic or aqueous liquid, an electrostatic precipitator, and a filter.

11. The method of claim 1, wherein the silicone microspheres have an average diameter of about 30 microns or less.

12. The method of claim 11, wherein the average diameter is about 2 microns or less.

13. The method of claim 1, wherein the silicone microspheres consist essentially of silicone.

14. The method of claim 1, wherein the silicone microspheres comprise a core-shell structure including a shell comprising silicone and a core comprising a core material different from silicone.

15. The method of claim 14, wherein the silicone microspheres comprise more than one core.

16. The method of claim 14, wherein the core material is selected from the group consisting of: a dye or fluorophore, a polymer, an oxide, a metal, a semiconductor, carbon, an ionic salt, a pharmaceutical agent and/or an active pharmaceutical ingredient (API).

17. The method of claim 14, wherein the silicone precursor solution further includes a core material precursor.

18. The method of claim 17, wherein a weight ratio of the core material precursor to the one or more oligomeric dimethylsiloxanes in the silicone precursor solution is from about 1:20 to about 1:1.

19. The method of claim 18, wherein the weight ratio is from about 1:10 to about 1:2.

20. The method of claim 14, further comprising exposing the silicone microspheres comprising the core-shell structure to a solvent for a time sufficient to dissolve the core material, thereby yielding hollow silicone microspheres.

* * * * *